US012521414B2

(12) United States Patent
Lien et al.

(10) Patent No.: US 12,521,414 B2
(45) Date of Patent: Jan. 13, 2026

(54) METHOD FOR PREVENTING OR TREATING UROLOGICAL CHRONIC PELVIC PAIN SYNDROME

(71) Applicants: National Health Research Institutes, Miaoli County (TW); National Taiwan University, Taipei (TW); National Chung Hsing University, Taichung (TW); National Cheng Kung University, Tainan (TW)

(72) Inventors: Wei-Chih Lien, Miaoli County (TW); Feng-Huei Lin, Miaoli County (TW); Hui-Min Wang, Miaoli County (TW); Tak Shing Ching, Miaoli County (TW); Xinran Zhou, Miaoli County (TW); Ya-Jyun Liang, Miaoli County (TW); Chia-Yih Wang, Miaoli County (TW); Fu-I Lu, Miaoli County (TW); Huei-Cih Chang, Miaoli County (TW)

(73) Assignees: National Health Research Institutes, Miaoli County (TW); National Taiwan University, Taipei (TW); CHUNG HSING UNIVERSITY, Taichung (TW); NATIONAL CHENG KUNG UNIVERSITY, Tainan (TW)

( * ) Notice: Subject to any disclaimer, the term of this patent is extended or adjusted under 35 U.S.C. 154(b) by 289 days.

(21) Appl. No.: 17/835,634

(22) Filed: Jun. 8, 2022

(65) Prior Publication Data
US 2023/0398142 A1   Dec. 14, 2023

(51) Int. Cl.
A61K 33/24   (2019.01)
A61K 9/51   (2006.01)
A61P 37/06   (2006.01)

(52) U.S. Cl.
CPC .............. *A61K 33/24* (2013.01); *A61K 9/51* (2013.01); *A61P 37/06* (2018.01)

(58) Field of Classification Search
CPC ...................................................... A61K 33/24
See application file for complete search history.

(56) References Cited

U.S. PATENT DOCUMENTS 9,669,055 B1 *   6/2017   Blough ............... A61K 9/0019
2011/0160157 A1 *   6/2011   Wang ...................... A61P 1/00
514/414

(Continued)

OTHER PUBLICATIONS

Koel Chaudhury, Narendra Babu K, Abhay K. Singh, Soumen Das, Amit Kumar, and Sudipta Seal. "Mitigation of endometriosis using regenerative cerium oxide nanoparticles." Nanomedicine: Nanotechnology, Biology, and Medicine, vol. 9 (2013), pp. 439-448. (Year: 2013).*

(Continued)

Primary Examiner — Isaac Shomer
(74) Attorney, Agent, or Firm — Sughrue Mion, PLLC

(57) ABSTRACT

Provided is a method for preventing or treating urological chronic pelvic pain syndrome (UCPPS) in a subject that includes administering an effective amount of cerium oxide nanoparticles (CeNPs) to the subject. Also provided is a method for preventing or treating an UCPPS in a subject that includes administering to the subject a pharmaceutical composition comprising an effective amount of the CeNPs and a pharmaceutically acceptable carrier thereof.

15 Claims, 14 Drawing Sheets
(4 of 14 Drawing Sheet(s) Filed in Color)
Specification includes a Sequence Listing.

(56) References Cited

U.S. PATENT DOCUMENTS

| | | | | |
|---|---|---|---|---|
| 2013/0337083 | A1* | 12/2013 | Reed | A61P 21/00 |
| | | | | 424/617 |
| 2018/0339913 | A1* | 11/2018 | Seal | C01F 17/235 |
| 2023/0099752 | A1* | 3/2023 | Han | A61K 33/244 |
| | | | | 424/497 |

OTHER PUBLICATIONS

Leena Adamian et al. "A Comprehensive Review of the Diagnosis, Treatment, and Management of Urologic Chronic Pelvic Pain Syndrome." Current Pain and Headache Reports, vol. 24:27, 2020, pp. 1-11. (Year: 2020).*

Anna V. Golubeva et al. "The mouse cyclophosphamide model of bladder pain syndrome: tissue characterization, immune profiling, and relationship to metabotropic glutamate receptors." Physiological Reports, vol. 2, Issue 3, 2014, e00260, pp. 1-17. (Year: 2014).*

Ajaz Ahmad Waza, Zeenat Hamid, Sajad Ali, Shabir Ahmad Bhat, Musadiq Ahmad Bhat. "A review on heme oxygenase-1 induction : is it a necessary evil." Inflammation Research, vol. 67, 2018, pp. 579-588. (Year: 2018).*

VC Minarchick, PA Stampleton, EM Sabolsky, and TR Nurkiewicz. "Cerium Dioxide Nanoparticle Exposure Improves Microvascular Dysfunction and Reduces Oxidative Stress in Spontaneously Hypertensive Rats." Frontiers in Physiology, VI. 6, Article 339, Nov. 2015, pp. 1-12 (Year: 2015).*

E-J Park, J Choi, Y-K Park, K Park. "Oxidative stress induced by cerium oxide nanoparticles in cultured BEAS-2B cells." Toxicology, vol. 245, 2008, pp. 90-100. (Year: 2008).*

CK Kim et al. "Ceria Nanoparticles that can Protect against Ischemic Stroke." Angewandte Chemie International Edition, vol. 51, 2012, p. 11039-11043, pp. 1-16 of supporting information and a cover page for the supporting information. (Year: 2012).*

Bin Ni et al. "Nrf2 Pathway Ameliorates Bladder Dysfunction in Cyclophosphamide-Induced Cystitis via Suppression of Oxidative Stress." Oxidative Medicine and Cellular Longevity, vol. 2021, Article ID 4009308, pp. 1-9. (Year: 2021).*

RM Molina, NV Konduru, RJ Jiminez, G Pyrgiotakis, p. Demokritou, W Wohlleben, and JD Brain. "Bioavailability, distribution and clearance of tracheally instilled, gavaged or injected cerium dioxide nanoparticles and ionic cerium." Environmental Science Nano, vol. 1, 2014, pp. 561-573. (Year: 2014).*

\* cited by examiner

```
                              SEQUENCE LISTING

<160> NUMBER OF SEQ ID NOS: 6

<210> SEQ ID NO 1
<211> LENGTH: 21
<212> TYPE: DNA
<213> ORGANISM: Artificial Sequence
<220> FEATURE:
<223> OTHER INFORMATION: Synthetic oligonucleotide primer

<400> SEQUENCE: 1
aaggtgaagg tcggagtcaa c                                                21

<210> SEQ ID NO 2
<211> LENGTH: 22
<212> TYPE: DNA
<213> ORGANISM: Artificial Sequence
<220> FEATURE:
<223> OTHER INFORMATION: Synthetic oligonucleotide primer

<400> SEQUENCE: 2
ggggtcattg atggcaacaa ta                                               22

<210> SEQ ID NO 3
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 3
agtgaggaac aagccagagc                                                  20

<210> SEQ ID NO 4
<211> LENGTH: 20
<212> TYPE: DNA
<213> ORGANISM: Artificial Sequence
<220> FEATURE:
<223> OTHER INFORMATION: Synthetic oligonucleotide primer

<400> SEQUENCE: 4 cagggtggt tattgcatct                                                   20

<210> SEQ ID NO 5
<211> LENGTH: 22
<212> TYPE: DNA
<213> ORGANISM: Artificial Sequence
<220> FEATURE:
<223> OTHER INFORMATION: Synthetic oligonucleotide primer

<400> SEQUENCE: 5
atggagacag atgtggggtg tg                                               22

<210> SEQ ID NO 6
<211> LENGTH: 22
<212> TYPE: DNA
<213> ORGANISM: Artificial Sequence
<220> FEATURE:
<223> OTHER INFORMATION: Synthetic oligonucleotide primer

<400> SEQUENCE: 6
tccctgagtg tcttctgtgt gc                                               22
```

METHOD FOR PREVENTING OR TREATING UROLOGICAL CHRONIC PELVIC PAIN SYNDROME

BACKGROUND

1. Technical Field

The present disclosure relates to a method for preventing or treating chronic pelvic pain syndrome, and particularly to a method for preventing or treating urological chronic pelvic pain syndrome.

2. Description of Related Art

Urological chronic pelvic pain syndrome (UCPPS) is a debilitating chronic visceral condition characterized by chronic lower abdominal and pelvic pain, as well as frequent and urgent urination. The prevalence of UCPPS is approximately 10% in the general population (8-11.5% in the male population [1]). Multiple hypotheses regarding the etiology of UCPPS have been proposed. While no consensus has been reached regarding the mode of initiation of the disease, chronic inflammation and serial induction likely play an integral role in its progression [2]. UCPPS has a significant socioeconomic impact of more than $70 billion annually, while treatment costs for UCPPS accelerate at a compound annual growth rate of approximately 5%. In addition to its associated healthcare costs, UCPPS negatively impacts psychosocial health and causes sleep disturbance, anxiety, and depression [3].

Visceral pain is caused by ischemia, inflammation, and overactivity of the walls of hollow organs. It is a hallmark of many conditions involving treatment-refractory pain, such as bladder pain syndrome and chronic pancreatitis, and contributes to a substantial decrease in quality of life. To date, the mechanisms of visceral pain including UCPPS remain poorly understood compared to those of somatic pain, and chronic visceral pain conditions are usually difficult to relieve efficiently.

Noninvasive or minimally invasive therapies, including physical therapy, pharmacological management, and nerve blockade, are used for treating UCPPS. However, their efficacy is limited to the duration of therapy. For example, pentosan polysulfate sodium (PPS), also known as Elmiron®, is an FDA-approved oral drug for UCPPS; however, it is an anticoagulant and might increase the risk of bruising and bleeding. In addition, non-steroid anti-inflammatory drugs (NSAIDs) merely has a short-term effect on treating UCPPS and thus need to be administered frequently (e.g., more than three times a day), which may lead to adverse effects such as kidney damage or allergies. Accordingly, this type of treatment is listed as a second-line treatment by the American Urological Association as requiring long-term oral administration and having low efficacy. Hyaluronic acid (HA) has been used to treat UCPPS via intravesical instillation due to its excellent biocompatibility. However, urination accelerates the loss of HA, and patients therefore require monthly perfusion, which increases the treatment costs and negatively impacts their quality of life.

Hence, there are still unmet medical need for alternate methods of treatment and prevention of UCPPS that can overcome the aforementioned drawbacks.

SUMMARY

In view of the above-mentioned problems in the art, the present disclosure provides a method for preventing or treating a urological chronic pelvic pain syndrome (UCPPS), comprising administering an effective amount of cerium oxide nanoparticles (CeNPs) to the subject in need thereof. In at least one embodiment of the present disclosure, the subject is a mammalian, e.g., human. In some embodiments, the administration of CeNPs may relieving pain and/or reducing urinary frequency of the subject suffering from UCPPS.

Cerium oxide ($CeO_2$) nanoparticles (CeNPs) have several promising benefits with respect to the management of UCPPS, including their long-term effect, low cost, fewer harmful side effects, and distinctive underlying mechanism of action. Specifically, CeNPs have distinctive antioxidant and/or catalytic properties due to the coexistence of oxidation states $Ce^{3+}$ and $Ce^{4+}$ and the reversible redox switch between these states. More specifically, a bulk crystal of $CeO_2$ mainly consists of $Ce^{4+}$; however, the relative amount of $Ce^{3+}$ increases significantly if the size of $CeO_2$ is reduced into nano-dimensions, which brings about higher catalytic effects. Accordingly, in at least one embodiment of the present disclosure, CeNPs may degrade reactive oxygen species (ROS) and/or reactive nitrogen species (RNS), and show extraordinary antioxidant properties by scavenging free radicals and remaining active in tissues for prolonged periods by spontaneous redox reactions. In some embodiments, CeNPs may prevent or treat the UCPPS related to oxidative stress due to their remarkable antioxidant properties. In some embodiments, the subject for reducing expression of heme oxygenase 1 (HO-1) in bladder of the subject, showing that UCPPS may reduce oxidative stress in the bladder of the subject.

In at least one embodiment of the present disclosure, the CeNPs are administered to the subject for reducing inflammation in the subject. In some embodiments, the administration of the CeNPs may reduce the proinflammatory factor or inflammatory factor in the subject including, but not limited to, IRF7, IRF9, Serpin B2, CXCL10, IL-6, and/or TNFα in bladder of the subject. For example, is at least one of IL-6, TNFα, SerpinB2, CXCL10 and heme oxygenase 1 (HO-1). In some embodiments, the CeNPs are administered to the subject for ameliorating edema and hemorrhage of bladder of the subject.

In at least one embodiment of the present disclosure, the particle diameter of the CeNPs is from about 10 nm to about 35 nm. In some embodiments, the particle diameter of the CeNPs is from about 10 nm to about 30 nm, e.g., from about 15 nm to about 25 nm, from about 20 nm to about 25 nm, or from about 22 nm to about 25 nm, but the present disclosure is not limited thereto.

In at least one embodiment of the present disclosure, the average particle diameter of the CeNPs is from about 22 nm to about 25 nm. In some embodiments, the average particle diameter of the CeNPs is from about 22 nm to about 24 nm, e.g., from about 22.5 nm to about 23.5 nm, and from about 22.5 nm to about 23 nm. In one embodiment of the present disclosure, the average particle diameter of the CeNPs is about 22.5 nm, about 22.51 nm, about 22.52 nm, about 22.53 nm, about 22.54 nm, about 22.55 nm, about 22.56 nm, about 22.6 nm, about 22.7 nm, about 22.8 nm, about 22.9 nm, and about 23.0 nm, but the present disclosure is not limited thereto.

In at least one embodiment of the present disclosure, the effective amount of the CeNPs is from about 3 mg/kg to about 100 mg/kg. In some embodiments, the effective amount of the CeNPs is from about 10 mg/kg to about 100 mg/kg, e.g., from about 10 mg/kg to about 90 mg/kg, from about 10 mg/kg to about 80 mg/kg, from about 15 mg/kg to about 70 mg/kg, from about 20 mg/kg to about 70 mg/kg, from about 20 mg/kg to about 50 mg/kg, from about 25 mg/kg to about 40 mg/kg, and from about 25 mg/kg to about 35 mg/kg, but the present disclosure is not limited thereto.

In at least one embodiment of the present disclosure, the CeNPs are administered to the subject 1 to 4 times a week, 1 to 4 times a month, or 1 to 4 times a year. In some preferable embodiments, the CeNPs is administered to the subject 1 time every 2 to 4 weeks, e.g., 1 time every 3 weeks.

In at least one embodiment of the present disclosure, the CeNPs is administered to the subject orally, intraperitoneally, intravenously, intradermally, intramuscularly, subcutaneously, or transdermally. In some preferable embodiments, the CeNPs is administered to the subject intraperitoneally or intravenously.

The present disclosure also provides a method for preventing or treating an UCPPS, comprising administering a subject in need thereof with a pharmaceutical composition that comprises an effective amount of the aforementioned CeNPs and a pharmaceutically acceptable carrier thereof. In some embodiments, the pharmaceutical composition is administered orally, intraperitoneally, intravenously, intradermally, intramuscularly, subcutaneously, or transdermally.

The present disclosure further provides a use of a pharmaceutical composition in the manufacture of a medicament for preventing or treating an UCPPS, wherein the pharmaceutical composition comprises an effective amount of the aforementioned CeNPs and a pharmaceutically acceptable carrier thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure can be more fully understood by reference to the following descriptions of the embodiments in conjunction with the accompanying drawings.

FIG. 1A is a scanning electron microscopy (SEM) imaging of cerium oxide nanoparticles (CeNPs). CeNPs were observed at 200,0008 magnification (scale bars: 200 nm). FIG. 1B shows the hydrodynamic size distribution of CeNPs. FIG. 1C is a transmission electron microscopy (TEM) imaging of CeNPs at 800,0008 magnification (scale bar: 2 nm).

FIG. 1D shows the XPS spectrum of CeNPs revealed the binding energy region of cerium. The 2nd, 3rd and 8th peaks indicated by arrows are $Ce^{3+}$ and the 1st, 4th-7th peaks indicated by arrows are $Ce^{4+}$.

FIG. 2A illustrates that T24 cells were treated with 4-HC at concentrations of 0, 12.5, 25, 37.5, 50, 75, and 100 μM for 4 h (hours). Cell viability was examined utilizing the WST-1 assay (MK400, Takara, Mountain View, CA, USA). At a concentration of 37.5 μM 4-HC, the cell viability of T24 cells decreased to approximately 50% (n=3).

FIG. 2B illustrates that 4-HC-induced loss of T24 viability was rescued by cerium oxide nanoparticle (CeNP) treatment (n=3). FIG. 2C shows a dichlorodihydrofluorescein diacetate (DCFDA) assay for T24 cells. Fluorescence microscope images of the groups: (1) control group; (2) only 4-HC group: 37.5 μM 4-HC added for 4 h to induce cell oxidative stress; (3) CeNP treatment group: 5 μg/mL CeNPs were applied for 24 h before 4-h induction with 37.5 μM 4-HC; and (4) CeNP-only group: only 5 μg/mL CeNPs were applied for 24 h. FIG. 2D indicates that IL-6 and TNFα were significantly upregulated by 4-HC; (1) control group; (2) 4-HC group: 37.5 μM 4-HC added for 4 h to induce cell oxidative stress; (3) CeNP+4-HC group: 5 μg/mL CeNPs were applied for 24 h before 4-h induction with 37.5 μM 4-HC; and (4) CeNP group: only 5 μg/mL CeNPs were applied for 24 h. Values are expressed as the mean±SD. Data were analyzed by one-way analysis of variance with Tukey's multiple comparisons test. *P<0.05, **P<0.01. n.s.: no statistical difference, (n=3).

FIG. 3C shows the representative voiding patterns in the control, CYP, and CeNP pre-treatment groups. Voiding spots are identified by *.

FIG. 4A shows the gross and hematoxylin and eosin (H&E) staining. The arrows indicate the suburothelial area. FIG. 4B is a chart of the edema score. Urinary bladders from animals with cyclophosphamide (CYP)-induced cystitis showing vascular engorgement and increased suburothelial thickness compared to the control group (CTL) and the cerium oxide nanoparticle (CeNP) pre-treatment group. FIG. 4C are images of high-power field and scanning electron microscopy (SEM). Only the bladders of the CYP group show incomplete mucosa and bare urothelial cells, which are indicated by whitish arrows. Exposed urothelial cells (arrows) were observed in the CYP group. Complete cell membrane structure (arrows) was identified in the control and CeNP pre-treatment groups. Values are expressed as the mean±SE. Data were analyzed using one-way analysis of variance with Tukey's multiple comparisons test. *P<0.05, **P<0.01. P>0.05, n.s.: no statistical difference (n=3).

DETAILED DESCRIPTION OF THE EMBODIMENTS

Figure 1A:
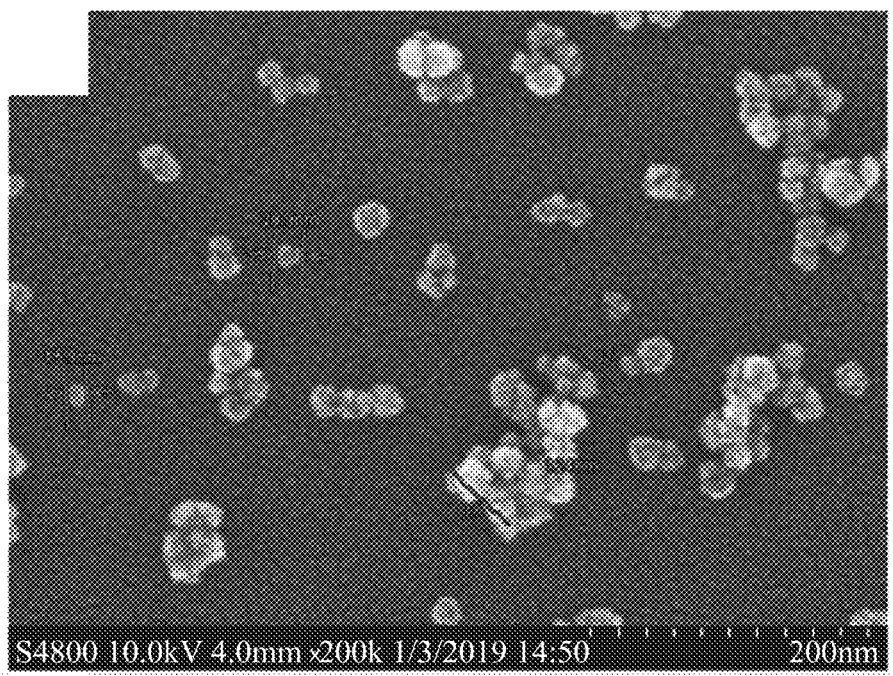
FIGS. 1A to 1D indicate the characterization of CeNPs.

The following examples are used for illustrating the present disclosure. A person skilled in the art can easily conceive the other advantages and effects of the present invention, based on the invention of the specification. The present invention can also be implemented or applied as described in different examples. It is possible to modify or alter the following examples for carrying out this invention without contravening its scope, for different aspects and applications.

As used herein, the singular forms "a," "an," and "the" include plural referents, unless expressly and unequivocally limited to one referent. The term "or" is used interchangeably with the term "and/or," unless the context clearly indicates otherwise.

As used herein, the phrase "at least one," in reference to a list of one or more elements, should be understood to mean at least one element selected from any one or more of the elements in the list of elements, but not necessarily including at least one of each element listed within the list of elements and not excluding any combinations of elements in the list of elements. This definition also allows that elements may optionally be present other than the elements identified within the list of elements to which the phrase "at least one" refers, whether related or unrelated to those elements identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

As used herein, the terms "comprising" (and any form of comprising, such as "comprise" and "comprises"), "having" (and any form of having, such as "have" and "has"), "including" (and any form of including, such as "includes" and "include"), and "containing" (and any form of containing, such as "contains" and "contain") are inclusive or open-ended and do not exclude additional, unrecited elements or method steps. For example, when describing an object "comprises" a limitation, unless otherwise specified, it may additionally include other elements, components, structures, regions, parts, devices, systems, steps, or connections, etc., and should not exclude other limitations.

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, up to 10%, up to 5%, or up to 1% of a given value. Alternatively, particularly with respect to biological systems or processes, the term can mean within an order of magnitude, such as within 5-fold or within 2-fold, of a value. Where particular values are described in the application and claims, unless otherwise stated the term "about" meaning within an acceptable error range for the particular value should be assumed.

The numeral ranges used herein are inclusive and combinable, any numeral value that falls within the numeral scope herein could be taken as a maximum or minimum value to derive the sub-ranges therefrom. For example, it should be understood that the numeral range "10 nm to 35 nm" comprises any sub-ranges between the minimum value of 10 nm to the maximum value of 35 nm, such as the sub-ranges from 10 nm to 20 nm, from 25 nm to 35 nm, and from 22 nm to 23 nm. In addition, a plurality of numeral values used herein can be optionally selected as maximum and minimum values to derive numerical ranges. For instance, the numerical ranges of 10 nm to 25 nm, 10 nm to 35 nm, and 25 nm to 35 nm can be derived from the numeral values of 10 nm, 25 nm, and 35 nm.

As used herein, the term "pharmaceutically acceptable carrier" refers to a pharmaceutically acceptable material, composition, or vehicle, such as diluents, disintegrating agents, suspending agents, wetting agents, flavoring agents, thickening agents, fillers, preservatives, binders, lubricants, glidants, and surfactants, which do not abrogate the biological activity or properties of the active ingredient (e.g., the CeNPs used herein), and is relatively non-toxic; that is, the vehicle may be administered to a subject without causing an undesirable biological effect or interacting in a deleterious manner with any of the components of the medical composition in which it is contained.

As used herein, the terms "treat," "treating," and "treatment" refer to acquisition of a desired pharmacologic and/or physiologic effect, e.g., alleviating or abrogating a disorder, disease, or condition, or one or more of the symptoms associated with the disorder, disease, or condition, or alleviating or eradicating the cause(s) of the disorder, disease, or condition itself. The effect may be prophylactic in terms of completely or partially preventing a disease or symptom thereof or may be therapeutic in terms of completely or partially curing, alleviating, relieving, remedying, or ameliorating a disease or an adverse effect attributable to the disease or symptom thereof.

As used herein, the terms "prevent," "preventing," and "prevention" refer to inclusion of a method of delaying and/or precluding the onset of a disorder, disease, or condition, and/or its attendant symptoms; barring a subject from acquiring a disorder, disease, or condition; or reducing a subject's risk of acquiring a disorder, disease, or condition.

As used herein, the term "subject" refers to a mammal, such as a human, but can also be another animal such as a domestic animal (e.g., a dog, a cat, or the like), a farm animal (e.g., a cow, a sheep, a pig, a horse, or the like) or a laboratory animal (e.g., a monkey, a rodent, a murine, a rabbit, a guinea pig, or the like). The term "patient" refers to a "subject" who is suspected to be, or afflicted with a disease or condition. "Subject in need thereof" or "patient in need thereof" is referred to herein as a subject or a patient diagnosed with, at risk or having, predetermined to have, or suspected of having a disease or disorder.

As used herein, the phrase "an effective amount" refers to the amount of an active agent that is required to confer a desired preventive or therapeutic effect on a subject in need thereof (e.g., reducing the oxidative stress or inflammation in the subject suffering form UCPPS). In at least one embodiments of the present disclosure, the effective amount of the CeNPs is from about 3 mg/kg to about 100 mg/kg, such as from about mg/kg to about 100 mg/kg, from about 10 mg/kg to about 90 mg/kg, from about 10 mg/kg to about 80 mg/kg, from about 10 mg/kg to about 70 mg/kg, from about 15 mg/kg to about 60 mg/kg, from about 15 mg/kg to about 50 mg/kg, from about 20 mg/kg to about 40 mg/kg, and from about 25 mg/kg to about 35 mg/kg. In some embodiments, the effective amount of the CeNPs has a lower limit chosen from 3 mg/kg, mg/kg, 15 mg/kg, 20 mg/kg, 21 mg/kg, 22 mg/kg, 23 mg/kg, 24 mg/kg, 25 mg/kg, 26 mg/kg, 27 mg/kg, 28 mg/kg, 29 mg/kg and 30 mg/kg, and an upper limit chosen from 100 mg/kg, 90 mg/kg, 80 mg/kg, 70 mg/kg, 60 mg/kg, 50 mg/kg, 40 mg/kg, 35 mg/kg, 34 mg/kg, 33 mg/kg, 32 mg/kg, 31 mg/kg and 30 mg/kg.

In at least one embodiment of the present disclosure, the particle diameter of the CeNPs is from about 10 nm to about 35 nm. In some embodiments of the present disclosure, the particle diameter of the CeNPs is from about 10 nm to about 30 nm, such as from about 15 nm to about 25 nm, from about 20 nm to about 25 nm, and from about 22 nm to about 25 nm. In another embodiment, the particle diameter of the CeNPs has a lower limit chosen from 10 nm, 15 nm, 20 nm, 22 nm, 22.4 nm, 22.47 nm, 22.48 nm, 22.49 nm, 22.50 nm, 22.51 nm, 22.52 nm, and 22.53 nm, and an upper limit chosen from 35 nm, 30 nm, 25 nm, 22.70 nm, 22.60 nm, 22.59 nm, 22.58 nm, 22.57 nm, 22.56 nm, 22.55 nm, 22.54 nm and 22.53 nm.

In at least one embodiment of the present disclosure, the average particle diameter of the CeNPs is from about 22 nm to about 25 nm. In one embodiment of the present disclosure, the average particle diameter of the CeNPs is from about 22 nm to about 24 nm, such as from about 22.5 nm to about 23.5 nm, and from about 22.5 nm to about 23 nm. In one embodiment of the present disclosure, the average particle diameter of the CeNPs is about 22.5 nm, about 22.51 nm, about 22.52 nm, about 22.53 nm, about 22.54 nm, about 22.55 nm, about 22.56 nm, about 22.6 nm, about 22.7 nm, about 22.8 nm, about 22.9 nm, and about 23.0 nm.

In one embodiment of the present application, ICR mice were treated with CeNPs one to two times a week to simulate the treatment period of humans (a weekly dose in ICR mice may be equivalent to a dose every three months in human), and the experimental data show that the administration of the CeNPs has a long-term therapeutical effect on preventing or treating UCPPS. In some preferable embodiments, the CeNPs is administered to the subject 1 time every 2 to 4 weeks, e.g., 1 time every 3 weeks.

The following examples are put forth so as to provide those of ordinary skill in the art with a complete invention and description of how to make and use the assay, screening, and therapeutic methods of the invention, and are not intended to limit the scope of what the inventors regard as their invention.

EXAMPLES

Synthesis and Characterization of CeNPs

CeNPs were synthesized under the following conditions, as previously described [4]: equal volumes of 0.0375 mol/L $Ce(NO_3)_3 \cdot 6H_2O$ (99.5%, Alfa Aesar, Ward Hill, MA, USA) and 0.5 mol/L hexamethylenetetramine (HMTA) (99.9%, Alfa Aesar) solutions were mixed and stirred at room temperature (22±1° C.) for 24 h. Then, the solution was centrifuged at 9,000 rpm for 30 minutes to obtain CeNP sediments. The sediments were washed twice with deionized water and ethanol (95%, Alfa Aesar).

The morphology and particle size of the CeNPs were measured using a scanning electron microscope (SEM) (Hitachi S-4800 Field Emission Scanning Electron Microscope with Energy Dispersive X-ray Spectrometer QUANTAX Annular XFlash® QUAD FQ5060, Hitachi, Tokyo, Japan) at an operating voltage of 10 kV. The SEM images (n=10) of the CeNPs were analyzed using Nano Measurer 1.2.5 software (National Cheng Kung University, Tainan, Taiwan) to calculate the average size of the CeNPs. For SEM morphological analysis, the attached accessory EDX (QUANTAX Annular XFlash®, QUAD FQ5060) was used to analyze the elemental composition of the samples. The SEM image of the CeNPs was observed at 200,000× magnification (scale bars 200 nm).

The grain sizes of CeNPs and interplanar spacing were analyzed using transmission electron microscopy (TEM). CeNPs were dispersed in 95% ethanol, ultrasonically dispersed for 10 min, dropped to 2-10 μL on a copper grid, and air dried. The grain size distribution of the nanoparticles was studied using TEM (JEOL 2010F, JEOL, Tokyo, Japan). The interplanar spacing, grain size (n=10), and selected area electron diffraction patterns of the crystals were measured and analyzed using DigitalMicrograph 3 software (Gatan Inc., Pleasanton, CA, USA).

The hydrodynamic size of the CeNPs was characterized using a Zetasizer NanoZS (Malvern Instruments, Worcestershire, UK) and dynamic light scattering (DLS). The intensity of the scattered light was detected at 90° relative to the incident beam. To confirm the dispersion of the synthesized CeNPs in different solvents, CeNPs were dispersed in double-distilled water, ultrasonically dispersed for 10 min, and measured at 25° C. (n=3). The obtained data were analyzed using the free software (Malvern Instruments, Zetasizer software) provided by the manufacturer.

The surface of CeNPs was characterized using X-ray photoelectron spectroscopy (XPS) (Theta Probe, Thermo Fisher Scientific, Waltham, MA, USA) with an Al K-alpha source to identify the oxidation state of cerium and quantify the $Ce^{3+}/Ce^{4+}$ ratio. The obtained data were input into the XPSPEAK41 software [5] to process the peak fitting.

Characterization of CeNPs

Figure 1B:
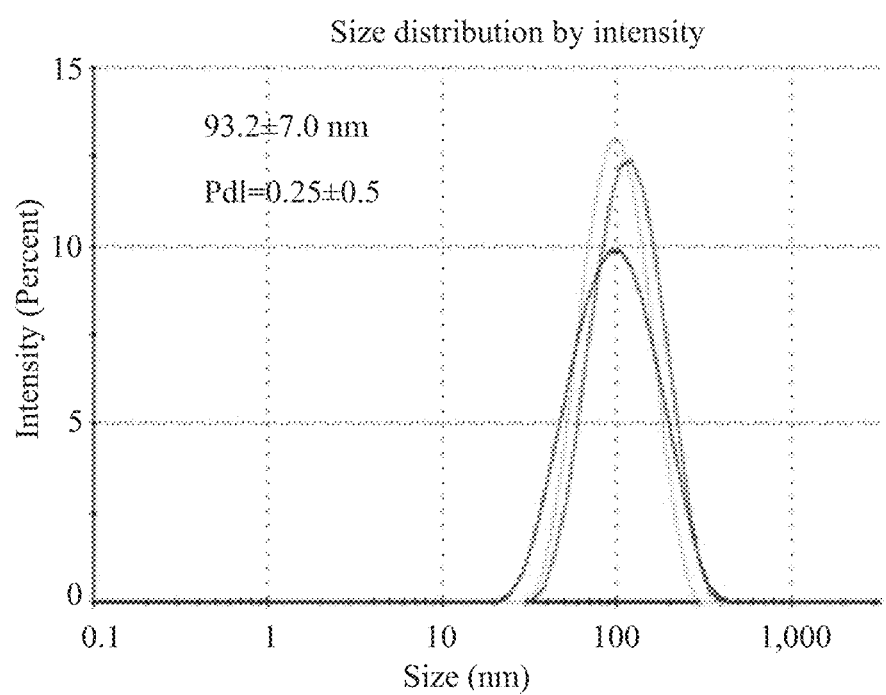
Figure 1C:
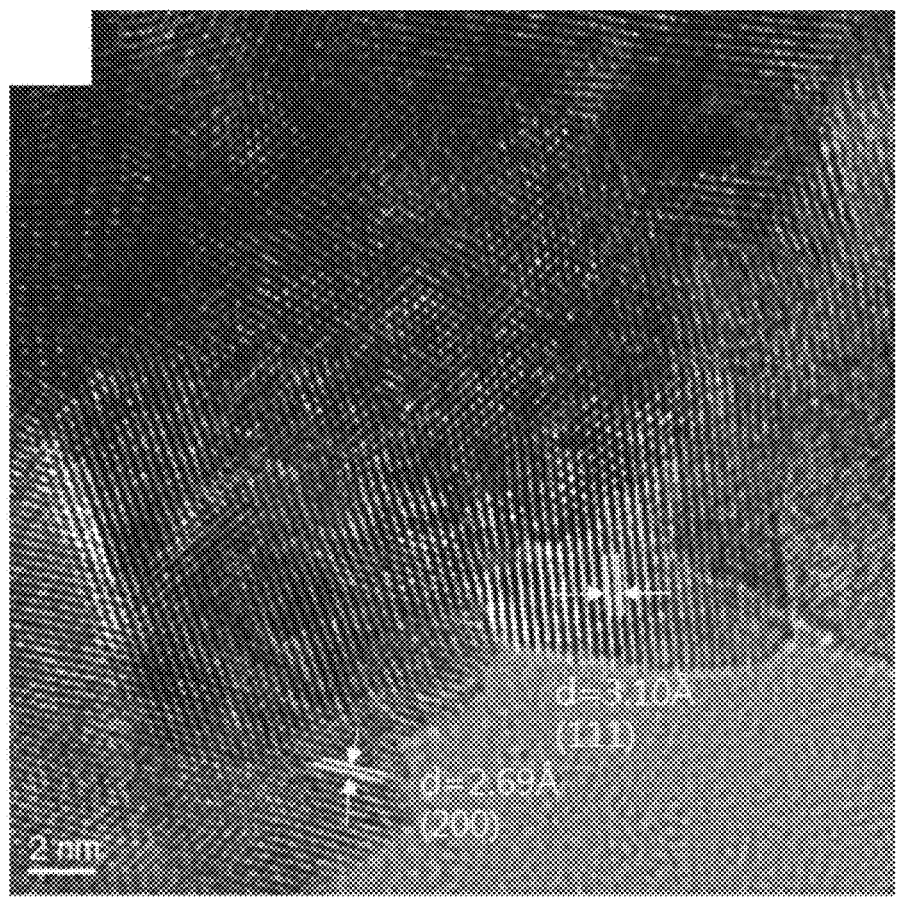
Figure 1D:
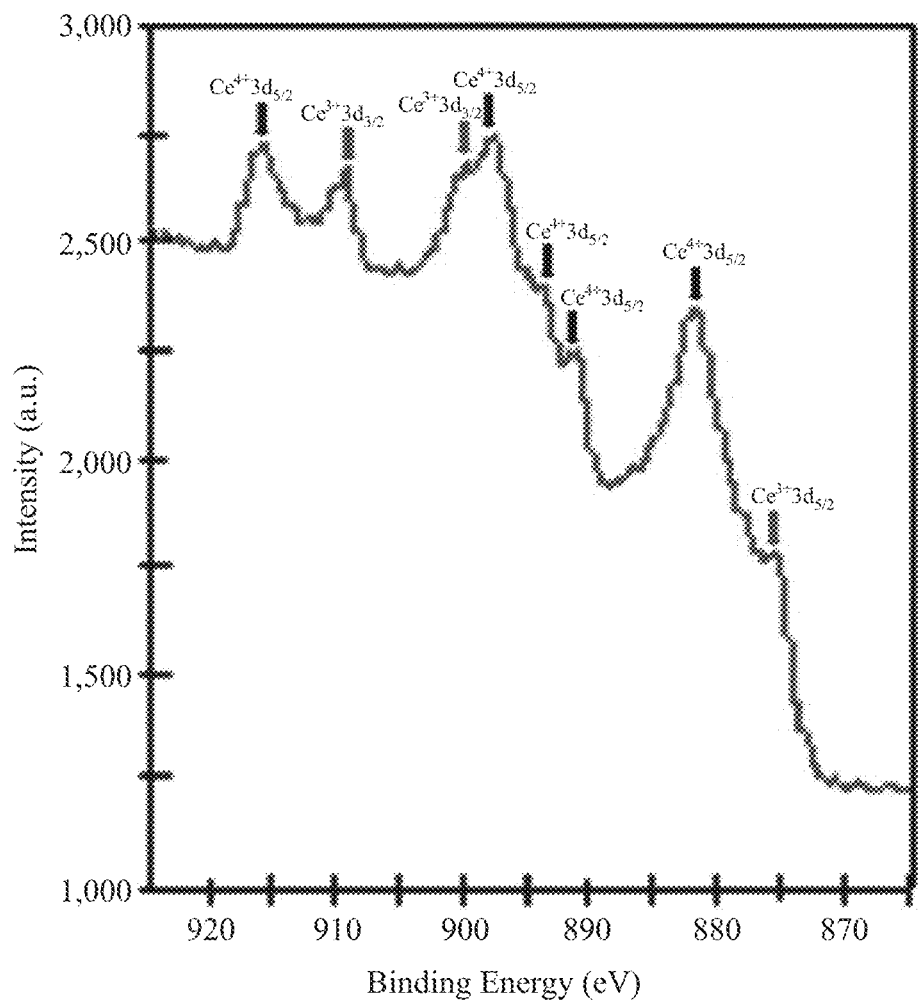

Using Nano Measurer software, the average particle diameter was found to be 22.53 nm (n=10) (FIG. 1A). The hydrodynamic size distribution of the CeNPs in double-distilled water was 93.2 nm, and the PdI was 0.25 (FIG. 1B). The high-resolution TEM image of CeNPs showed lattice fringes and d spacing related to the (111) and (200) crystalline planes, which was comparable with the morphology of CeNPs (FIG. 1C). XPS showed chemical bonding peaks corresponding to $Ce^{3+}$ (the 2nd, 3rd and 8th peaks indicated by arrows in FIG. 1D) and $Ce^{4+}$ (the 1st, 4th-7th peaks indicated by arrows in FIG. 1D) at the respective binding energies. The peaks between 875 and 895 eV correspond to Ce $3d_{5/2}$, while the peaks between 895 and 910 eV correspond to the Ce $3d_{3/2}$ degenerate levels. The deconvoluted peaks located at 875.100, 900.650, and 909.000 eV correspond to the $Ce^{3+}$ oxidation states. The deconvoluted peaks observed at 881.240, 890.900, 893.400, 897.300, and 915.550 eV can be ascribed to the $Ce^{4+}$ state of cerium ions.

Timeline of the Evaluation of CeNPs Treatment in CYP-Induced Cystitis Mice

Figure 2A:
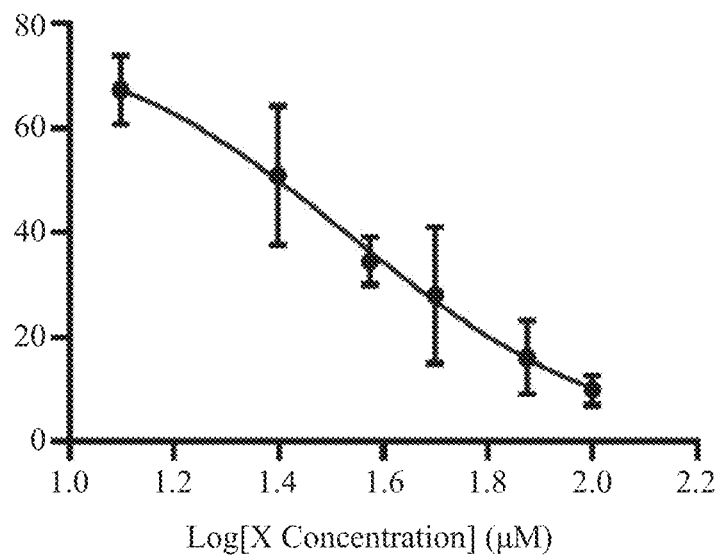
FIGS. 2A to 2D illustrate the CeNPs testing with human urothelial T24 cells in vitro.
Figure 2B:
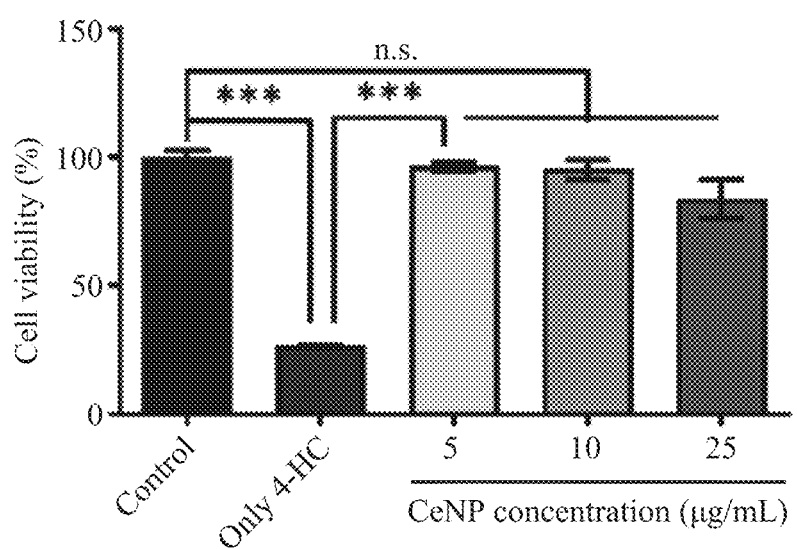
Figure 2C:
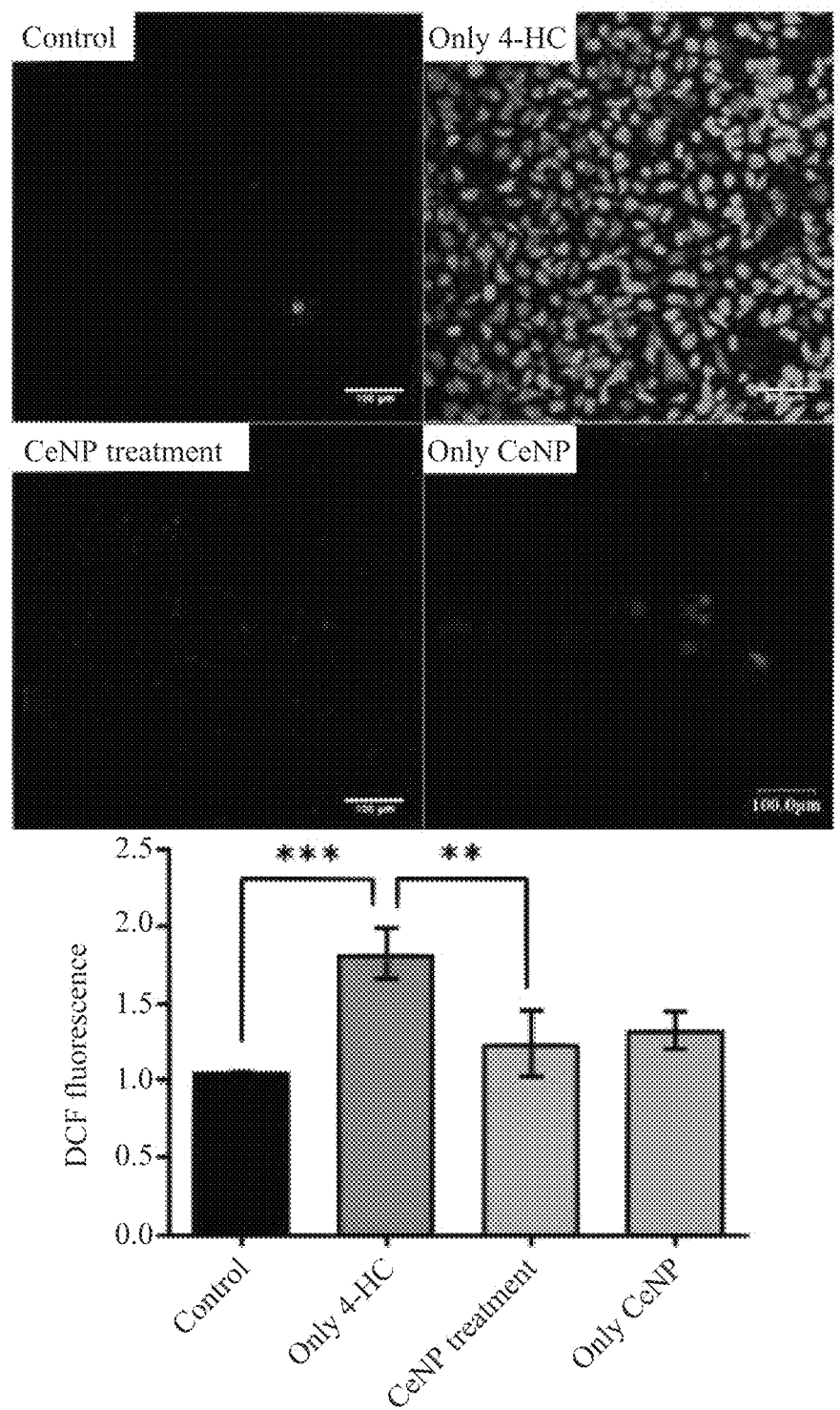
Figure 2D:
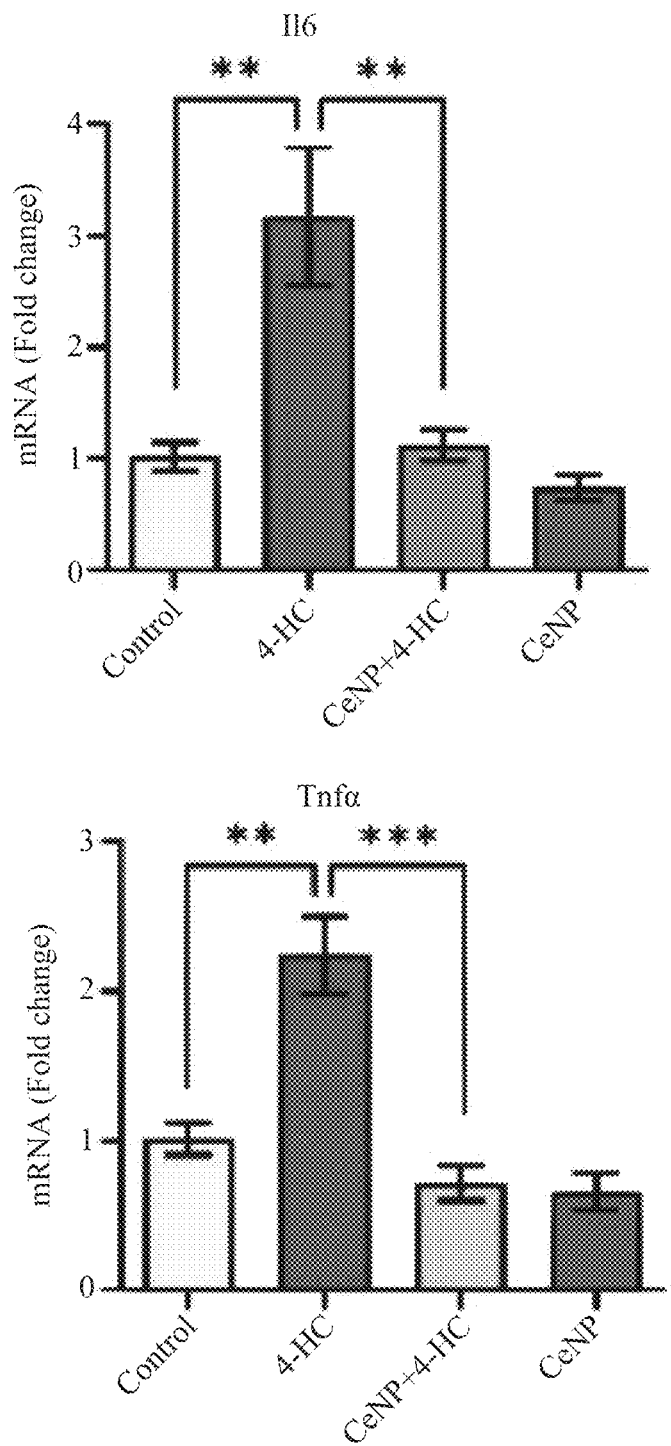

Table 1 is the timeline for testing the effect of CeNPs in vivo. ICR mice were divided into 4 groups (control, CYP, Pre-treated CeNPs and Post-treated CeNPs). There were 8 mice in each group. Except the control group, ICR mice were intraperitoneal injected with CYP in a dose of 80 mg/kg to induce cystitis at day 7, 9, 11 and 13. In the pre-treated CeNPs group, mice were intraperitoneal injected with CeNPs in a dose of 30 mg/kg at day 0 and 4. Instead, mice in control group and CYP group were injected with PBS at day 0 and 4. In the post-treated CeNPs group, mice were treated with 30 mg/kg CeNPs via intraperitoneal injection at day 8 and 13. At day 14, all mice were performed with mechanical sensitivity testing and voiding spot assay before sacrificed. After $CO_2$ euthanasia, the bladders of mice were collected and frozen with liquid nitrogen for further histological and biochemical analysis.

sion values using the $2^{-\Delta\Delta Ct}$ method. qPCR primers (5'-3') are listed in Table 2. The qPCR results are shown in FIG. 2D.

TABLE 1

Timeline for CeNPs treatment in CYP-induced cystitis mice

|  | day 0 | day 4 | day 7 | day 8 | day 9 | day 11 | day 12 | day 13 | day 14 |
|---|---|---|---|---|---|---|---|---|---|
| Control | PBS | PBS | PBS |  | PBS | PBS |  | PBS | Behavioral |
| CYP | PBS | PBS | CYP |  | CYP | CYP |  | CYP | tests |
|  |  |  | 80 |  | 80 | 80 |  | 80 | ↓ |
|  |  |  | mg/kg |  | mg/kg | mg/kg |  | mg/kg | Sacrifice |
| Pre-treated CeNPs | CeNPs 30 mg/kg | CeNPs 30 mg/kg | CYP 80 mg/kg |  | CYP 80 mg/kg | CYP 80 mg/kg |  | CYP 80 mg/kg |  |
| Post-treated CeNPs |  |  | CYP 80 mg/kg | CeNPs 30 mg/kg | CYP 80 mg/kg | CYP 80 mg/kg | CeNPs 30 mg/kg | CYP 80 mg/kg |  |

Example 1: The Effects of 4-HC on the Viability of Human Urothelial T24 Cells, CeNP Treatment, and Intracellular ROS Measurement Human urothelial T24 cells (#60062, BCRC, Taiwan) were cultured in 90% McCoy's 5a medium (Sigma, St. Louis, MO, USA) with 1.5 mM L-glutamine, 10% (v/v) fetal bovine serum, and 1% (v/v) PS. Cells were maintained at 37° C. in a humidified incubator containing 5% $CO_2$ [6], and 4-HC was used to induce cellular oxidative stress. T24 cells were seeded into a 96-well plate at a density of $10^4$ cells/well and incubated for 24 h until full adhesion was achieved. In the wells of treated T24 cells, various concentrations of CeNPs were added to the medium for another 24 h of incubation. Next, various concentrations of 4-HC (0, 12.5, 25, 37.5, 50, 75, and 100 μM) were added to the medium and incubated for 4 h. T24 cell viability was decreased upon 4-hydroperoxycyclophosphamide (4-HC) treatment and intracellular reactive oxygen species (ROS) generation was induced. At a concentration of 37.5 IIM, 4-HC decreased the cell viability to 50% (IC50) and was selected as the induction concentration for subsequent experiments (FIG. 2A). Different concentrations of CeNPs were applied before 4-HC induction. After a series of experiments, a concentration of 5 μg/mL CeNPs was able to effectively alter the cell viability that was reduced by 4-HC (FIG. 2B).

To confirm the inhibitory effect of CeNPs on the 4-HC-induced cellular oxidative stress response, dichlorodihydrofluorescein diacetate (DCFDA) assay was used and T24 cells were cultured under four conditions, (1) control; (2) in the presence of 37.5 IIM 4-HC for 4 h to induce cell oxidative stress; (3) in the presence of 5 μg/mL CeNPs for 24 h before 4 h of induction with 37.5 μM 4-HC; and (4) in the presence of only 5 μg/mL CeNPs for 24 h. The amount of green fluorescence (DCF) is positively correlated with the intracellular ROS content. The CeNPs had an inhibitory effect on the 4-HC-induced cellular oxidative stress response (FIG. 2C).

Total RNA was extracted from cells using the TRIzol reagent (Invitrogen, Carlsbad, CA, USA). GAPDH was utilized as an endogenous control. cDNA was synthesized using the SensiFAST cDNA Synthesis kit (Bioline, London, UK) using random hexamer and poly (dT) primers. PCR was performed using the qPCR System (StepOne™ Software v2.2). Each sample was analyzed in triplicate for both the target gene and endogenous control. The averaged Ct values of the triplicates were used for further analyses. The Ct value for the target gene from each sample was normalized to its endogenous control and transformed to relative gene expression values using the $2^{-\Delta\Delta Ct}$ method. qPCR primers (5'-3') are listed in Table 2. The qPCR results are shown in FIG. 2D.

IL-6 and TNFα were significantly upregulated by 4-HC; however, they were downregulated in the CeNP+4-HC group. In the CeNP groups, the cells did not exhibit excessive inflammation-related gene expression, confirming that 24 h of 5 μg/mL CeNP application did not cause cell inflammation.

TABLE 2 primers for qPCR test
Sequence (5'-3')

Human primers

| GAPDH forward | AAGGTGAAGGTCGGAGTCAAC (SEQ ID NO: 1) |
|---|---|
| GAPDH reverse | GGGGTCATTGATGGCAACAATA (SEQ ID NO: 2) |
| Il6 forward | AGTGAGGAACAAGCCAGAGC (SEQ ID NO: 3) |
| Il6 reverse | CAGGGGTGGTTATTGCATCT (SEQ ID NO: 4) |
| Tnfα forward | ATGGAGACAGATGTGGGGTGTG (SEQ ID NO: 5) |
| Tnfα reverse | TCCCTGAGTGTCTTCTGTGTGC (SEQ ID NO: 6) |

Example 2: Mechanical Sensitivity Testing

Figure 3A:
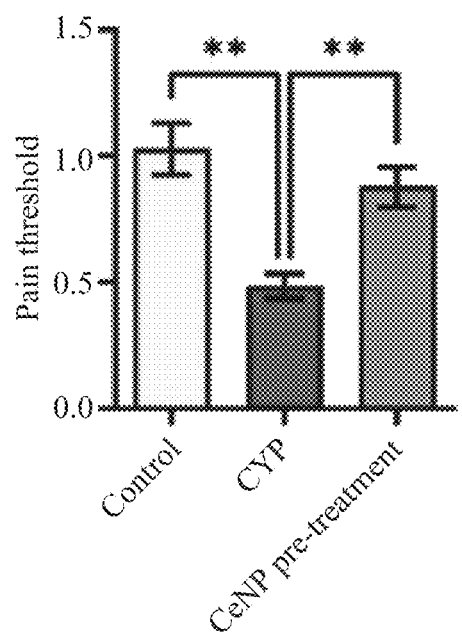
FIGS. 3A to 3C indicate the results of mechanical sensitivity testing and voiding spot assay respectively. Pain thresholds of the control, CYP, and CeNP pre-treatment groups are shown in FIG. 3A. Quantification of the number of individual voiding spots among the control, CYP, and CeNP pre-treatment groups are shown in FIG. 3B. The values are presented as the mean±standard error. The data were compared via one-way analysis of variance with Tukey's post-hoc tests. *P<0.05, **P<0.01. P>0.05: no significant difference (n.s.), n=3.

Mechanical sensitivity was evaluated using Semmes-Weinstein monofilaments (Ugo Basile, Comerio, Italy). Mice were tested in individual cages with a stainless steel wire grid floor. The stimulation was restricted to the lower abdominal area in the common region of the bladder and performed in separate areas inside this region to prevent desensitization. Three types of behaviors were recognized as positive responses to monofilament stimulation: 1) jumping, 2) immediate licking or scratching of the area of monofilament stimulation, or 3) sharp retraction of the abdomen. Each monofilament was applied for 1-2 s with an inter-stimulus interval of 5 s. The "up and down" method was used to determine the 50% threshold (T50). Based on the calculation of the most reliable threshold, six successive attempts with different filaments were required [7]. The formula T50=Xf+kd (Xf, represents the last monofilament used, k represents the Dixon's table coefficient, and d represents the average of the filament interval) was applied to determine T50. Animals with CYP-induced cystitis showed a decreased pain threshold (n=3 per group, *P<0.05), which was alleviated in the CeNP pre-treatment group (n=3 per group, *P<0.05) (FIG. 3A).

Example 3: Voiding Spot Assay

Figure 3B:
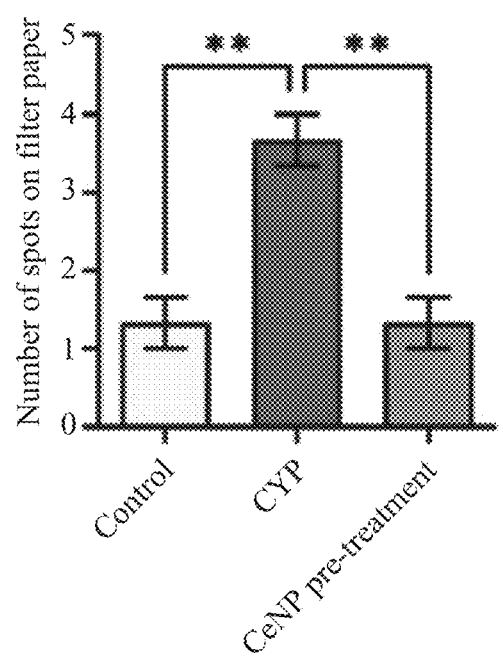
Figure 3C:
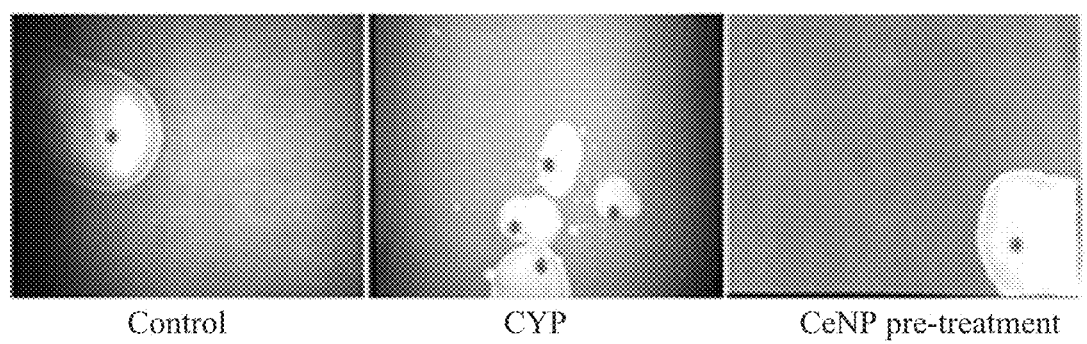

On the day of sacrifice, the mice were placed in individual wire mesh-bottomed cages over filter paper (Whatman No. 1, AW1001-00917, Sigma-Aldrich, St Louis, MO, USA) for 3 h in a quiet room, and food and water were restricted [8]. The filter paper was collected, dried, and imaged using a FluorChem digital imaging system (Alpha Innotech Corporation, San Leandro, CA, USA) under ultraviolet light at 365 nm. The volume was calculated by comparing the area of the spots to the calibration curve. The area and number of void spots were calculated by analyzing the images using ImageJ with Void Whizzard [9]. Animals with CYP-induced cystitis showed an increased voiding frequency (n=3 per group, *P<0.05), which was alleviated in the CeNP pre-treatment group (n=3 per group, *P<0.05) (FIGS. 3B and 3C).

Example 4: The Histological Changes in the Mouse Bladder Following CYP-Induced Cystitis and the Protective Effects of CeNP Pre-Treatment After $CO_2$ euthanasia, the bladders of mice were removed and placed into a labeled tube frozen with liquid nitrogen and stored at −80° C. for further histological and biochemical analysis. To assess gross morphological changes, bladder cross-sections (16 µm thick) were stained using a standard hematoxylin and eosin (H&E) protocol; they were placed in modified Harris hematoxylin solution for 4 minutes and in Eosin Y solution (alcoholic) (Sigma-Aldrich) for 1 minute.

Each bladder was sectioned by excising the dome of the bladder, ensuring that the inside cavity was clearly visible. Eight slides (all for H&E) with eight sections on each slide were collected. This section represents the thickest middle part of the bladder. A previous study showed that at the macroscopic level, urinary bladders from animals treated with CYP exhibit increased suburothelial thickness compared to the control group based on the edema score [10]. For SEM, the samples were fixed in 2.5% phosphate-buffered glutaraldehyde (0.1 M pH 7.4) for 24 h, post-fixed with 1% $OsO_4$ for 1 h, dehydrated in a graded alcohol series, placed into amyl acetate, dried with liquid $CO_2$ under pressure with a critical point dryer, and covered with gold particles.

Figure 4A:
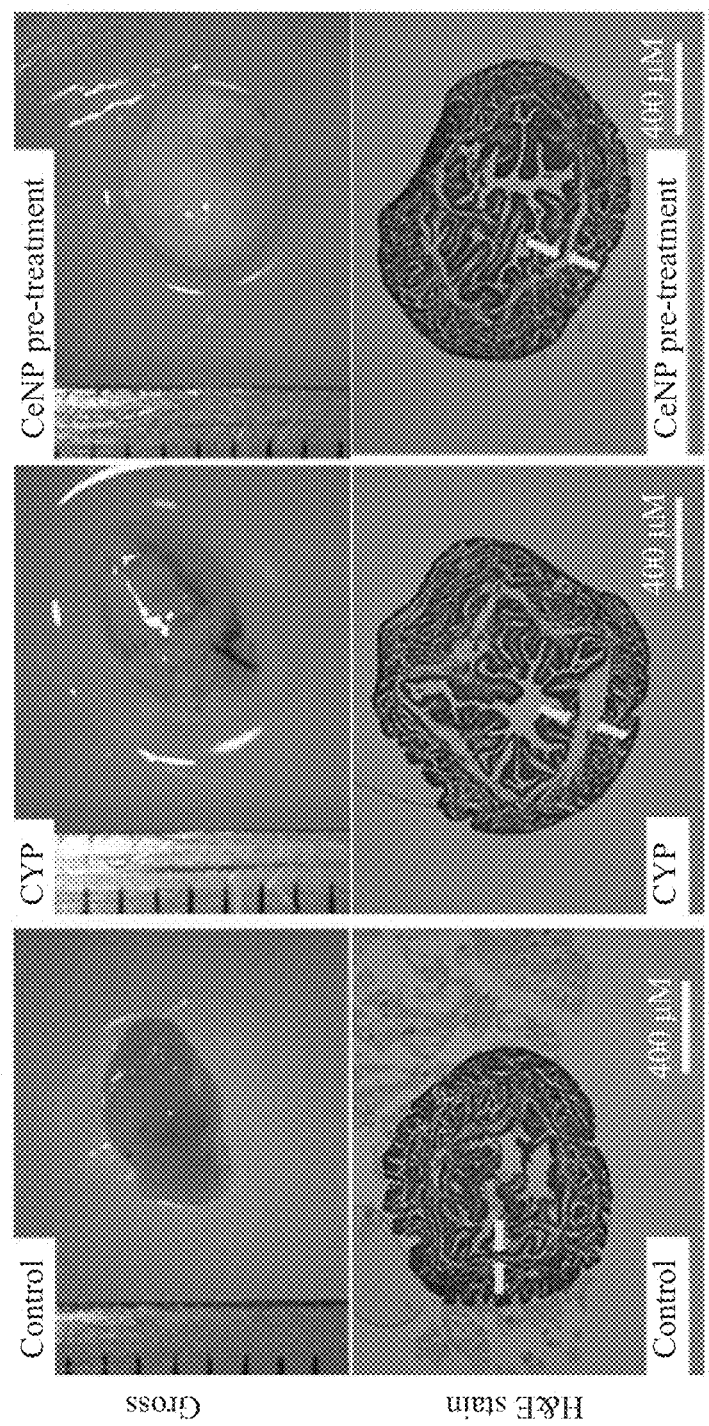
FIGS. 4A to 4C illustrate the histological changes in the mouse bladder following CYP-induced cystitis and protective effects of CeNP pre-treatment.
Figure 4B:
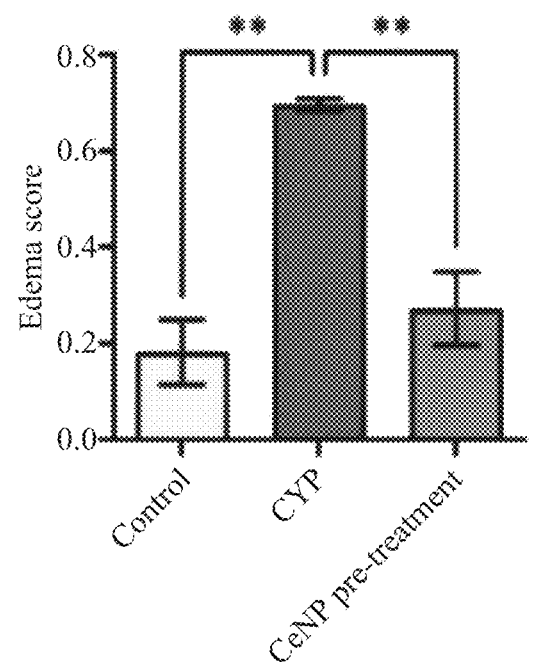
Figure 4C:
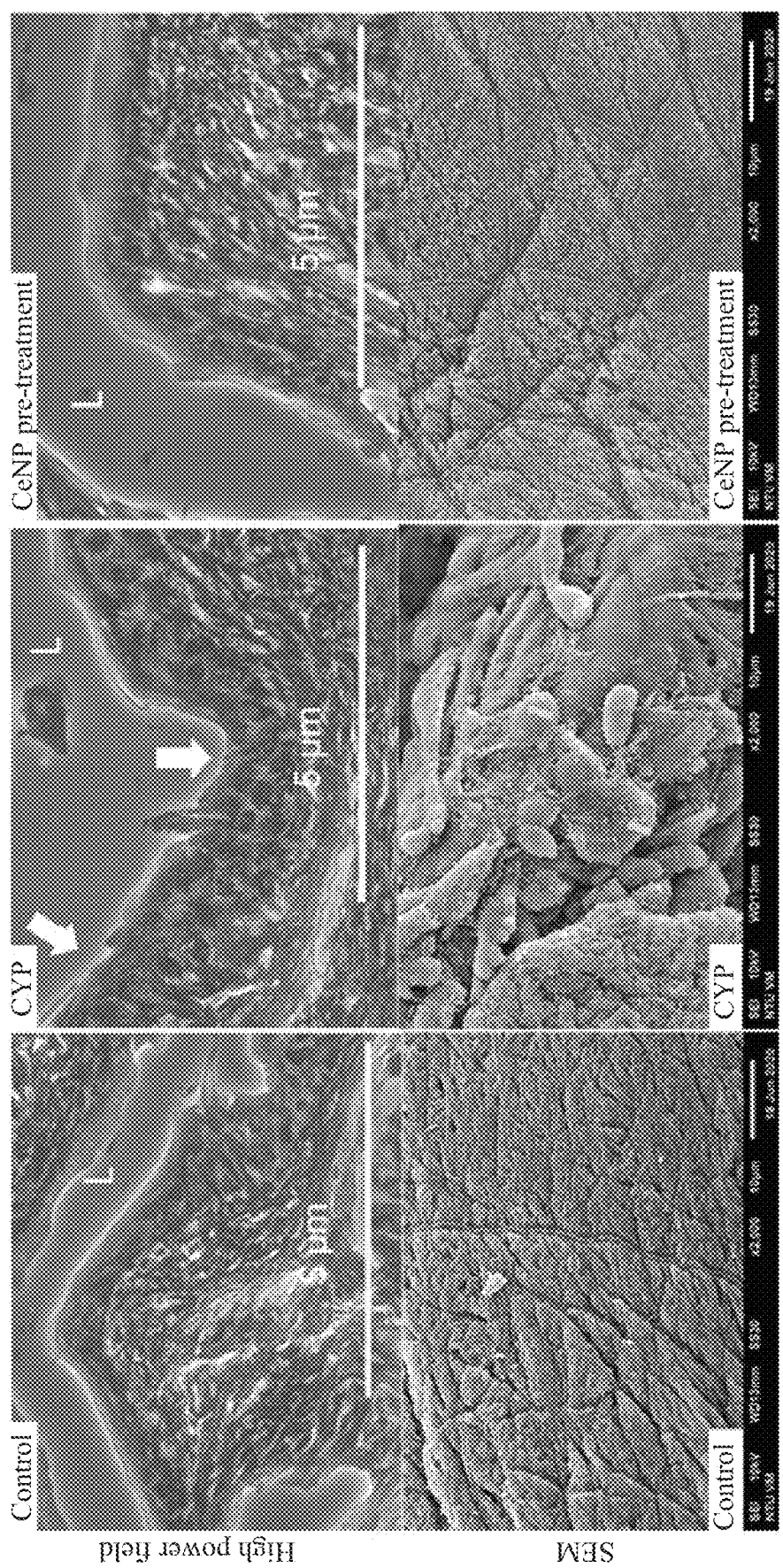

At the macroscopic level, the urinary bladders from animals treated with CYP exhibited more edema and hemorrhage compared to the control group. Furthermore, increased suburothelial thickness was observed in the CYP-treated animals compared to in the control group (FIGS. 4A and 4B). These samples were observed using SEM. H&E staining revealed that urinary bladders of animals with CYP-induced cystitis suffered loss of urothelial integrity and had almost completely denuded urothelium compared to the control (CTL) and CeNP pre-treatment groups (FIG. 4C). Only the bladders of the CYP group show incomplete mucosa and bare urothelial cells, which are indicated by whitish arrows. Exposed urothelial cells (arrows) were observed in the CYP group. Complete cell membrane structure (arrows) was identified in the control and CeNP pre-treatment groups.

Example 5: Analysis of SERPINB2, CXCL10, and Heme Oxygenase 1 (HO-1) Expression Levels Using Western Blotting The expression of SerpinB2, CXCL10, and HO-1 was analyzed using western blotting. The primary antibodies, anti-SerpinB2 (#ab269275, Abcam, Cambridge, MA, USA), anti-CXCL10 (#ab9938, Abcam), anti-HO-1 (#ab13248, Abcam), and anti-β-actin (#26276, GeneTex, Irvine, CA, USA) at a 1:7,000 dilution were incubated overnight at 4° C. Next, the membranes were washed with washing buffer three times for 30 minutes followed by incubation with a 1:6,000 dilution of secondary anti-rabbit (#213110-01, GeneTex) or anti-mouse (#213110-01, GeneTex) IgG antibody at 37° C. for 1 h. Finally, the membranes were rinsed with Immobilon Western Chemiluminescence HRP substrate (WBKLS0500, Millipore, Billerica, MA, USA), and protein bands were analyzed using a luminescence imaging system (model: M3-8068; Hansor, Taichung, Taiwan).

Figure 5:
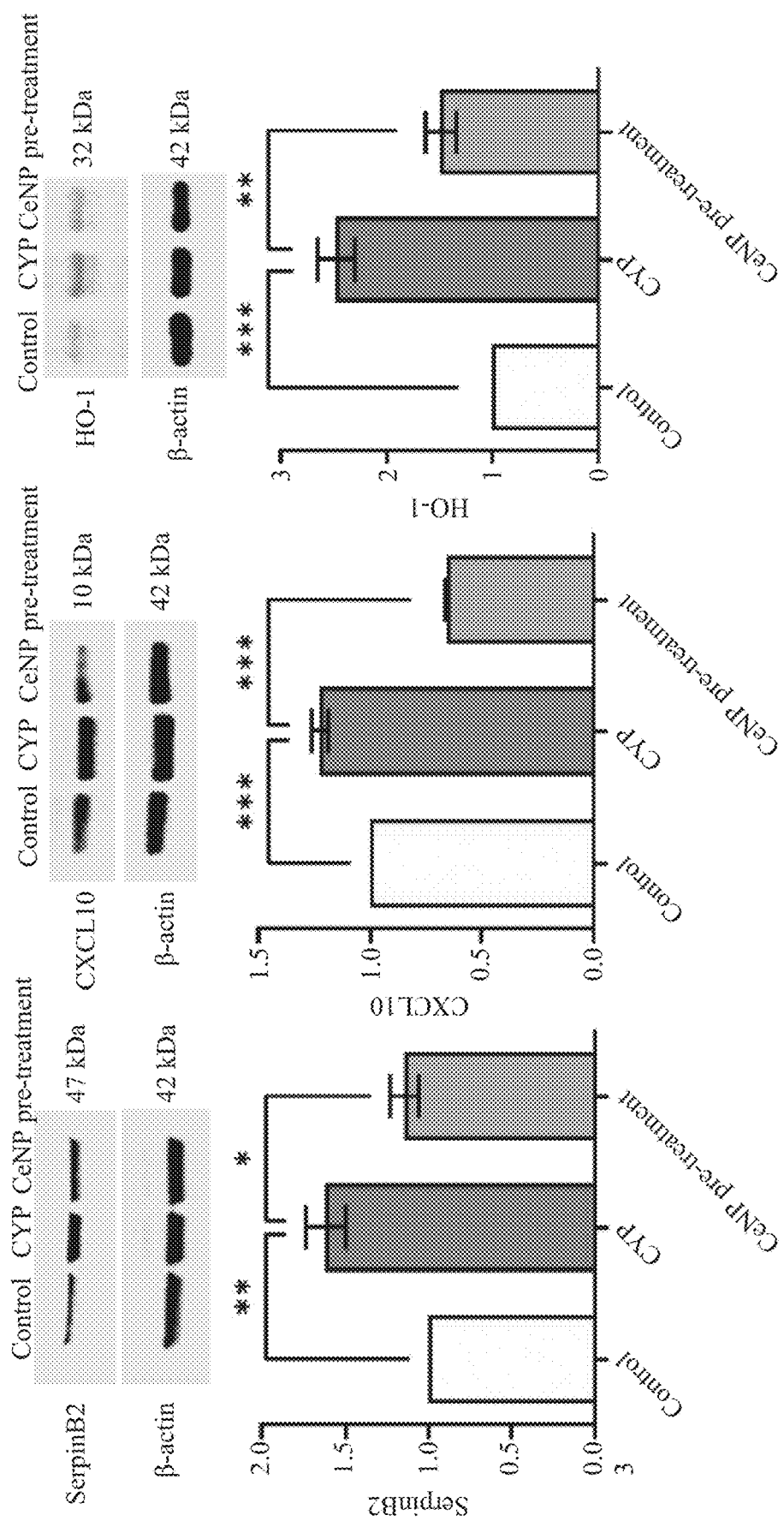
FIG. 5 shows the relative amount of SerpinB2, CXCL10, and heme oxygenase 1 (HO-1) in the bladders of control (CTL), cyclophosphamide (CYP), and cerium oxide nanoparticle (CeNP) pre-treatment groups. Values are expressed as the mean±SE. Data were analyzed using one-way analysis of variance with Tukey's multiple comparisons test. *P<0.05, **P<0.01. P>0.05: n.s., no statistical difference (n=3).
Figure 6:
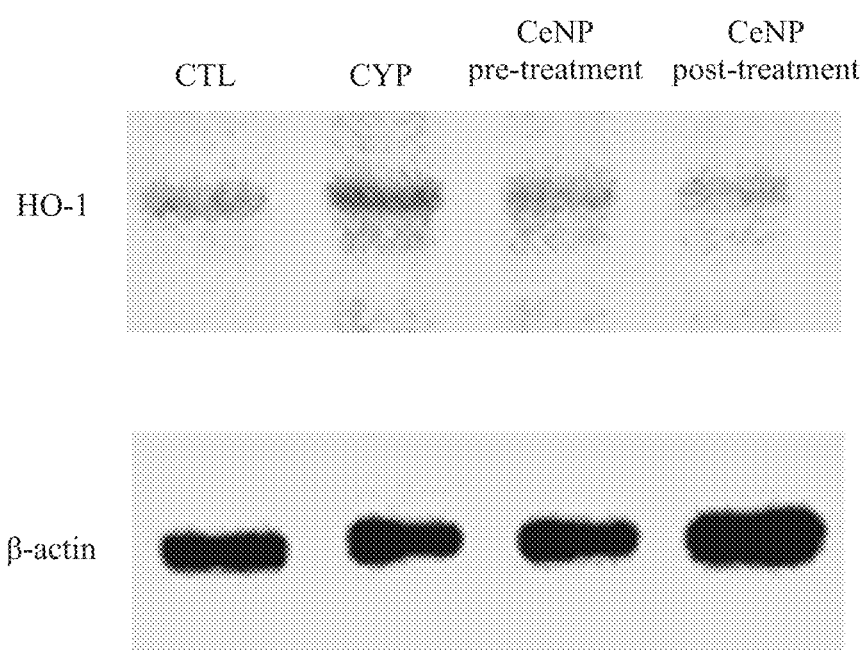
FIG. 6 shows relative amount of heme oxygenase 1 (HO-1) in the bladders of control (CTL), cyclophosphamide (CYP), the cerium oxide nanoparticle (CeNP) pre-treatment group, and the CeNP post-treatment group.
Figure 7:
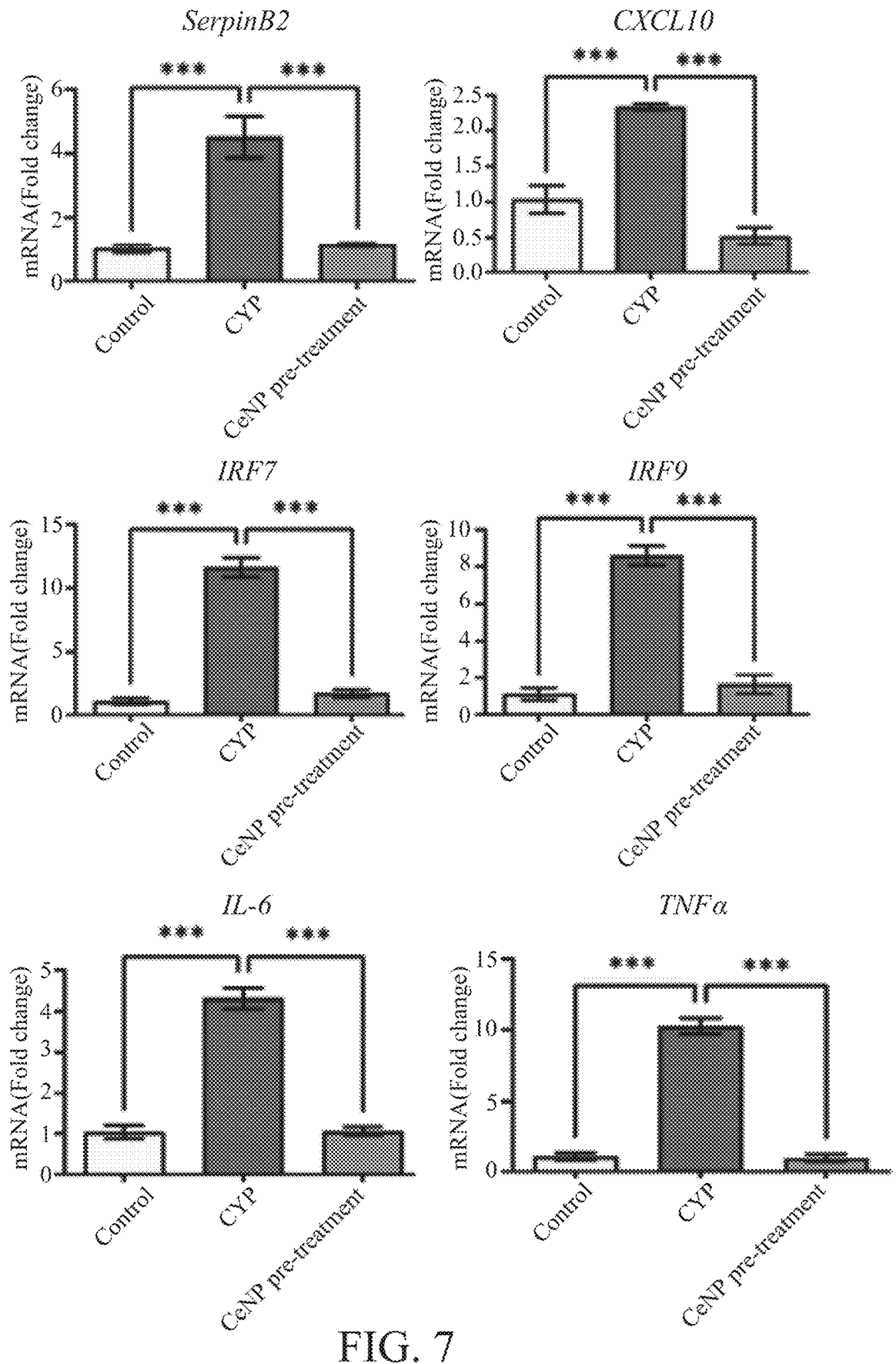
FIG. 7 shows relative amount of Serpin B2, CXCL10, IRF7, IRF9IL-6, and TNFα in bladder of the control (CTL), cyclophosphamide (CYP), cerium oxide nanoparticle (CeNP) pre-treatment groups. Values are expressed as the mean±SD. Data were analyzed by one-way analysis of variance with Tukey's multiple comparisons test. ***P<0.001, (n=3).

The western blot showed an increase in the levels of SerpinB2, CXCL10, and HO-1 in the urinary bladders of animals treated with CYP compared to those observed in the control and CeNP pre-treatment groups (FIG. 5), and the qPCR results show an increase in the mRNA levels of Serpin B2, CXCL10, IRF7, IRF9, IL-6, and TNFα in the urinary bladder of the of animals treated with CYP compared to those observed in the control and CeNP pre-treatment groups (FIG. 7). Similar result could be found in the CeNP post-treatment group. The level of HO-1 in the CeNP post-treatment was significantly lower than that in the CYP group (FIG. 6).

In summary, the present disclosure provides a method for preventing or treating UCPPS by administration of CeNPs to the subject in need thereof. The administration of CeNPs not only overcome the oxidative stress and inflammation in the bladder of the subject, but also had an analgesic effect and reduced urinary frequency in the subject. In addition, compared with the existing therapies for UCPPS, the method of the present disclosure has long-term effect, lower cost, fewer harmful side effects, and minimal invasiveness.

REFERENCES

1. Clemens, J. Q., et al., Urologic chronic pelvic pain syndrome: insights from the MAPP Research Network. Nature reviews. Urology, 2019. 16(3): p. 187-200.
2. Nunez-Badinez, P., et al., Preclinical models of endometriosis and interstitial cystitis/bladder pain syndrome: an Innovative Medicines Initiative-PainCare initiative to improve their value for translational research in pelvic pain. PAIN, 2021. 162(9): p. 2349-2365.
3. Lai, H. H., et al., Characterization of Whole Body Pain in Urological Chronic Pelvic Pain Syndrome at Baseline: A MAPP Research Network Study. Journal of Urology, 2017. 198(3): p. 622-631.
4. Zhang, F., Q. Jin, and S.-W. Chan, Ceria nanoparticles: Size, size distribution, and shape. Journal of Applied Physics, 2004. 95(8): p. 4319-4326.
5. Walczak, M. S., et al., Determining the chemical composition of corrosion inhibitor/metal interfaces with XPS: minimizing post immersion oxidation. JoVE (Journal of Visualized Experiments), 2017(121): p. e55163.
6. Teng, Y.-N., et al., Etoposide Triggers Cellular Senescence by Inducing Multiple Centrosomes and Primary Cilia in Adrenocortical Tumor Cells. Cells, 2021. p. 1466.
7. Dixon, W. J., Efficient analysis of experimental observations. Annu Rev Pharmacol Toxicol, 1980. 20: p. 441-62.
8. de Oliveira, M. G., et al., Deletion or pharmacological blockade of TLR4 confers protection against cyclophosphamide-induced mouse cystitis. Am J Physiol Renal Physiol, 2018. 315(3): p. F460-f468.
9. Wegner, K. A., et al., Void spot assay procedural optimization and software for rapid and objective quantification of rodent voiding function, including overlapping urine spots. Am J Physiol Renal Physiol, 2018. 315(4): p. F1067-f1080.

10. Cayan, S., et al., The bladder acellular matrix graft in a rat chemical cystitis model: functional and histologic evaluation. J Urol, 2002. 168(2): p. 798-804.

What is claimed is:

1. A method for preventing or treating urological chronic pelvic pain syndrome (UCPPS) related to oxidative stress, comprising administering an effective amount of cerium oxide nanoparticles (CeNPs) to a subject in need thereof, wherein the cerium oxide nanoparticles have an average particle diameter of from about 22 nm to about 25 nm, and wherein the CeNPs are administered to the subject intraperitoneally.

2. The method according to claim 1, wherein the urological chronic pelvic pain syndrome is selected from the group consisting of painful bladder syndrome, interstitial cystitis, chronic prostatitis, and any combination thereof.

3. The method according to claim 1, wherein the cerium oxide nanoparticles are administered to the subject for reducing oxidative stress in the subject.

4. The method according to claim 1, wherein the cerium oxide nanoparticles have coexistence of oxidative states $Ce^{3+}$ and $Ce^{4+}$ for reducing the oxidative stress by redox reaction.

5. The method according to claim 4, wherein the cerium oxide nanoparticles are administered to the subject for reducing expression of heme oxygenase 1 (HO-1) in bladder of the subject.

6. The method according to claim 1, wherein the cerium oxide nanoparticles are administered to the subject for reducing inflammation in the subject.

7. The method according to claim 5, wherein the cerium oxide nanoparticles are administered to the subject for ameliorating edema and hemorrhage of bladder of the subject.

8. The method according to claim 1, wherein the cerium oxide nanoparticles are administered to the subject for relieving pain of the subject.

9. The method according to claim 1, wherein the cerium oxide nanoparticles are administered to the subject for reducing urinary frequency of the subject.

10. The method according to claim 1, wherein the therapeutically effective amount of the cerium oxide nanoparticles is from about 3 mg/kg to about 100 mg/kg.

11. The method according to claim 1, wherein the cerium oxide nanoparticles are administered to the subject 1 to 4 times a week, 1 to 4 times a month, or 1 to 4 times a year.

12. The method according to claim 1, wherein the cerium oxide nanoparticles are administered to the subject 1 time every 2 to 4 weeks.

13. The method according to claim 1, wherein the subject is a mammalian.

14. The method according to claim 1, wherein the subject is human.

15. A method for preventing or treating urological chronic pelvic pain syndrome (UCPPS) related to oxidative stress, comprising administering a pharmaceutical composition to a subject in need thereof, wherein the pharmaceutical composition comprises an effective amount of cerium oxide nanoparticles (CeNPs) and a pharmaceutically acceptable carrier thereof, wherein the cerium oxide nanoparticles have an average particle diameter of from about 22 nm to about 25 nm, and wherein the CeNPs are administered to the subject intraperitoneally.

* * * * *